United States Patent
Johnson et al.

(12)

(10) Patent No.: US 6,348,118 B1
(45) Date of Patent: Feb. 19, 2002

(54) METHOD AND COMPOSITION FOR BONDING COMPONENTS TO GLASS

(75) Inventors: Michael A. Johnson, Stillwater; Jon M. Pennycook, Oakdale, both of MN (US)

(73) Assignee: 3M Innovative Properties Company, St. Paul, MN (US)

( * ) Notice: Subject to any disclaimer, the term of this patent is extended or adjusted under 35 U.S.C. 154(b) by 1208 days.

(21) Appl. No.: 08/796,500

(22) Filed: Feb. 6, 1997

Related U.S. Application Data

(63) Continuation of application No. 08/372,575, filed on Jan. 13, 1995, now abandoned.

(51) Int. Cl.$^7$ .............................................. B32B 31/00
(52) U.S. Cl. ................. 156/273.3; 156/273.5; 156/246; 156/64; 248/205.3; 248/467; 522/71; 522/103; 522/170
(58) Field of Search .......................... 156/273.3, 273.5, 156/246, 64; 248/205.3, 467; 522/71, 103, 170

(56) References Cited

U.S. PATENT DOCUMENTS

| | | | | |
|---|---|---|---|---|
| 3,131,251 A | * | 4/1964 | Ryan | 248/467 |
| 3,285,802 A | | 11/1966 | Smith | |
| 4,170,688 A | | 10/1979 | Roentgen et al. | |
| 4,230,766 A | * | 10/1980 | Gaussens et al. | 522/103 |
| 4,483,951 A | * | 11/1984 | Brenner | 522/71 |
| 4,552,604 A | * | 11/1985 | Green | 156/246 |
| 4,717,605 A | * | 1/1988 | Urban et al. | 156/273.5 |
| 5,086,088 A | * | 2/1992 | Kitano et al. | 522/170 |
| 5,160,780 A | | 11/1992 | Ono et al. | |
| 5,262,232 A | | 11/1993 | Wilfong et al. | |
| 5,587,236 A | | 12/1996 | Agrawal et al. | |

FOREIGN PATENT DOCUMENTS

DE         33 39 754 A1    11/1983

OTHER PUBLICATIONS

3M Internal Documents. (Filed Under MPEP 724).
Olosky, M. L., and Watson, M. J., "Silicone Film Adhesives: Bonding Automotive Fixtures to Glass", SAE Technical Paper Series, Mar. 1–5, 1993, No. 931013, pp. 1–5.
"Saflex® Polyvinyl Butyral Inner Layer, Laminating Guide, Polyvinyl Butyral Mirror–Mount Plastic", Monsanto Company, St. Louis, MO, pp. 1–8.

* cited by examiner

*Primary Examiner*—John J. Gallagher
(74) *Attorney, Agent, or Firm*—Patrick J. O'Connell

(57) ABSTRACT

A method of bonding a component to glass comprising disposing a pressure-sensitive adhesive sheet material between said component and said glass so that said adhesive sheet material is adhered to said component and said glass, wherein said adhesive sheet material comprises the photopolymerization reaction product of starting materials comprising: (a) a monomeric mixture or partially prepolymerized syrup comprising at least one acrylic acid ester of an alkyl alcohol and at least one copolymerizable monomer; (b) an epoxy resin or a mixture of epoxy resins, (c) a heat-activatable hardener for the epoxy resin or mixture of epoxy resins, (d) a photoinitiator, and (e) a pigment.

15 Claims, No Drawings

METHOD AND COMPOSITION FOR BONDING COMPONENTS TO GLASS

This is a continuation of application Ser. No. 08/372,575, filed Jan. 13, 1995, now abandoned.

FIELD OF THE INVENTION

The invention relates to a thermosettable pressure sensitive adhesive, a sheet material comprising the adhesive, and a method for bonding components to glass.

BACKGROUND

In the automotive industry, mirrors bases have been attached to windshields and the automobile body by means of paste-like urethane or silicone adhesives, as well as polyvinyl butyral films. There have been some shortcomings of using the paste-like adhesives, including a lack of strength prior to curing which can cause the mirror base to slip and become misaligned. There is also a tendency to flow out under the weight of the mirror base, which may require an additional finishing step to remove the material that has flowed out. Polyvinyl butyral films, on the other hand, suffer from having poor moisture and heat resistance which can result in the mirror base falling off of the glass plate to which it is adhered.

U.S. Pat. No. 5,160,780 (Ono) describes the use of an organopolysiloxane material (also referred to in the industry as silicone rubbers) useful for bonding a mirror base to glass plate. The organopolysiloxane becomes cross-linked after autoclaving at elevated temperatures. However, the silicone rubbers are elastomeric and can be subject to creep during sustained loads.

Thermosetting pressure sensitive adhesive materials have been described in U.S. Pat. No. 5,086,088 (Kitano et al.). Viscoelastic materials useful in damping constructions are described in U.S. Pat. No. 5,262,232 (Wilfong et al.).

SUMMARY OF THE INVENTION

A method of bonding a component to glass comprising disposing a pressure-sensitive adhesive sheet material between said component and said glass so that said adhesive sheet material is adhered to said component and said glass. The adhesive sheet material comprises the photopolymerization reaction product of starting materials comprising:

(a) a monomeric mixture or partially prepolymerized syrup comprising at least one acrylic acid ester of an alkyl alcohol and at least one copolymerizable monomer;

(b) an epoxy resin or a mixture of epoxy resins;

(c) a heat-activatable hardener for the epoxy resin or mixture of epoxy resins;

(d) a photoinitiator; and (e) a pigment.

In another embodiment, the starting materials further comprise a silane. The invention also provides a pressure-sensitive adhesive sheet material comprising the photopolymerization reaction product of starting materials comprising components (a) to (e) above and further comprising a silane.

DETAILED DESCRIPTION

The present invention provides colored thermosettable pressure sensitive adhesive sheet materials which change in the shade of color on curing. The preferred adhesives, after thermal curing, have a relatively low elasticity and are characterized by having an elongation at break of less than 100%, and preferably less than 75%. The cured adhesives have good vibration damping properties and exhibit a tan delta greater than 0.1 between a range of between about 0 C. and 170 C. The adhesive sheet materials are pressure sensitive in nature, i.e., tacky, and have a storage modulus between about $5 \times 10^4$ to about $10^7$ dynes per square centimeter at room temperature before thermal curing. Alternatively, instead of thermal curing, the adhesive may be cured by radiation. After thermally curing of the sheet materials, the adhesives are thermoset and have a storage modulus greater than $2 \times 10^7$ between temperatures of $-40$ C. and 100 C. Preferably, the sheet material is initially prepared by coating a photopolymerizable, thermosettable pressure sensitive adhesive composition onto a film treated with a release coating and exposing to ultraviolet radiation to form the sheet material. The sheet material is subsequently adhesively adhered between two objects to be bonded, and thermally cured at temperatures from about 100 C. to 200 C. for about 5 to 60 minutes. As the pressure sensitive adhesive is cured to form a thermoset resin the adhesive becomes lighter in color as measured by a HunterLab colorimeter, and indicates when sufficient curing has occurred. In a preferred embodiment, the adhesive comprises an acrylic moiety, an epoxy moiety, and a pigment. In a more preferred embodiment, the adhesive comprises an acrylic moiety, an epoxy moiety, a coloring agent, and an organofunctional silane.

In the practice of the invention, the epoxy moiety comprises from about 20 to 150 parts by weight per one hundred parts of acrylate, i.e., the acrylate and the co-polymerizable monomers, and preferably from 40 to 120 parts epoxy per one hundred parts of acrylate, and more preferably 60 to 100 parts of epoxy per one hundred parts of acrylate. .In a highly preferred composition, the pigment comprises a carbon black or graphite pigment.

Preferred acrylic materials include photopolymerizable prepolymeric or monomeric acrylate mixtures. Useful acrylic materials include monoethyleneically unsaturated monomers that have a homopolymer glass transition temperature less than 0 C. Preferred monomers are monofunctional acrylic or methacrylic esters of non-tertiary alkyl alcohols having from 2 to 20 carbon atoms, and preferably from 4 to 12 carbon atoms in the alkyl moiety. Useful esters include n-butyl acrylate, hexyl acrylate, 2-ethylhexyl acrylate, octyl acrylate, dodecyl acrylate, lauryl acrylate, octadecyl acrylate, and mixtures thereof.

The acrylate moiety may optionally include a co-polymerizable reinforcing monomer. The reinforcing monomer is selected to have a higher homopolymer glass transition temperature than a homopolymer of only the acrylate monomer. Useful reinforcing monomers include isobornyl acrylate, N-vinyl pyrrolidone, N-vinyl caprolactam, N-vinyl piperidine, N,N-dimethylacrylamide, and acrylonitrile.

A small amount of an acidic monomer, such as acrylic acid, may also be included in the acrylic moiety as long as it does not negatively affect the curing of the epoxy moiety or the desired overall performance of the adhesive. If used, the amount of acid is preferably less than about 2 percent by weight of the acrylic moiety, i.e., the total weight of the acrylate, the co-polymerizable reinforcing monomer, and the acidic monomer.

When the prepolymeric or monomeric mixture includes both an acrylate and a reinforcing monomer, the acrylate will generally be present in an amount of about 50 to 95 parts by and the reinforcing monomer will be present in a corresponding amount of 50 to 5 parts by weight.

The adhesive compositions also preferably include a free radical photoinitiator that is activatable by ultraviolet radiation. An example of useful photoinitiator is benzil dimethyl ketall (Irgacure™651 available from Ciba Geigy). The photoinitiator is typically used in amounts from about 0.01 to 5 parts by weight per 100 parts of the acrylate monomers.

The adhesives of the invention also preferably include an acrylate cross-linking agent. The cross-lking agent increases the modulus of the adhesive in the pressure-sensitive state so that when it is used to bond an object to a surface with pressure either from the weight of the object or from an external source it resists flowing out and around the object during thermal curing. Useful cross-linking agents are those that are free-radically polymerizable from acrylate monomers such as divinyl ethers and multi-functional acrylates that do not interfere with the curing of the epoxy resin. Examples of multi-functional acrylates include, but are not limited to, 1,6-hexanediol diacrylate, tri-methylol-propane triacrylate, pentaerythritol tetraacrylate, and 1,2-ethylene glycol diacrylate. Amounts up to about 1 part per 100 parts acrylate monomers are preferred, and amounts of 0.01 to 0.2 part are preferred.

Useful epoxy resins are selected from the group of compounds that contain an average of more than one, and preferably at least two epoxy groups per molecule. The epoxy resin can be either solid, semi-solid, or liquid at room temperature. Combinations of different types of epoxy resins can be used. Representative epoxy resins include, but are not limited to phenolic epoxy resins, bisphenol epoxy resins, hydrogenated epoxy resins, aliphatic epoxy resins, halogenated bisphenol epoxy resins, novalac epoxy resins, and mixtures thereof Preferred epoxy resins are those formed by the reaction of bisphenol-A with epichlorohydrin. Examples of commercially available epoxy resins include Epon™828 and Epon™1001 from Shell Chemical Co.

The epoxy resins are cured with any type of an epoxy hardener, preferably a heat activatable hardener. The hardener is included in an amount sufficient to affect the curing of the epoxy under heat. Preferably, the hardener is selected from the group comprising dicyandiamide or polyamine salts. The heat activatable hardener will typically be used in an amount of about 0.1 to 20 parts by weight, and preferably 0.5 to 10 parts by weight per 100 parts by weight of the acrylate monomers.

In cases where the oven curing temperatures may be insufficient to fully cure the epoxy resin, it is useful to include an accelerator in the adhesive composition before making the sheet material so that the resin can fully cure at a lower temperature, or within a shorter period of time. Imidazoles and urea derivatives are particularly preferred as accelerators because of their ability to extend the shelf life of the sheet materials. Examples of preferred imidazoles are 2,4-diamino-6-(2-methyl-imidazoyl)-ethyl-s-triazine isocyanurate, 2-phenyl-4-benzyl-5-hydroxymethylimidazole, 2,4-dimaino-6(2'-methyl-imidazoyl)-ethyl-s-triazine, hexakis (imidazole)nickel phthalate, and toluene bisdimethylurea. An accelerator may be used in amounts up to about 20 parts by weight per 100 parts by weight of the acrylate monomers.

In a preferred embodiment, the pigment that is selected for modifying the adhesive formulation preferably exhibits good light transmittance below 400 nm. Light transmittance is pigment concentration dependent; the higher the loading of pigment, the lower the amount of light that will be capable of penetrating into the center of the adhesive mass. Light transmittance may be measured using a UV-visible spectrophotometer such as Hewlett Packard HP8452A UV-visible Diode Array Spectrophotometer. In practice, the amount of light transmittance below 400 nm should be measurable (i.e., >0%), especially in the region where the photoinitiator exhibits absorbence. This insures that detectable light energy is penetrating through the thickness of the adhesive mass and allowing the absorption characteristics of the photoinitiator to perform its initiation function by absorbing light energy.

A pigment is any substance that imparts color to another substance or mixture. Preferred pigments include carbon black, and graphite pigments. A useful commercially available pigment is an 18% graphite dispersion in phenyloxy-acrylate sold under the tradename Pennco™9B 117 by Penncolor, Doylestown, Pa. Both carbon black and graphite exhibit uniform transmittance as a function of wavelength through the visible and UV regions of the electromagnetic spectrum. They also exhibit a decrease in transmittance as pigment concentration increases. The amount of pigment used should not exceed a concentration threshold that unduly interferes with achieving acceptable cure of the adhesive composition through its thickness. In practice the proper amount of pigment is influenced by the intensity of the light source and the thickness of the adhesive mass. Since the rate of polymerization for photoinitiated free radical polymerization reactions is proportional to the square root of the light intensity, and molecular weight is inversely proportional to light intensity, it then follows that incorporating a carbon black or graphite pigment into a thick cross-section UV curing adhesive will influence the ability to achieve cure as well as the resulting physical properties of the adhesive. In a preferred embodiment, the adhesive of the invention also includes an organofunctional silane.

Silanes have the following general formula

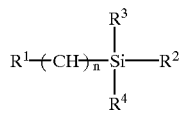

The silanes that are useful in the practice of the present invention include those having the following organic functionalities wherein $R^1$ is either vinyl, halogen, epoxy, acrylate, methacrylate, amine, mercapto, styryl or ureido; and $R^2$, $R^3$, and $R^4$ is halo, methoxy, etboxy, propoxy, or beta-methoxyethoxy; and n is an integer between 0 and 8. Organofunctional silanes are commercially available from such sources as Huls, America. The silanes are incorporated in a fashion as to impart specific performance and visual characteristics to the tape construction. The incorporation of organofunctional silanes has been discovered to provide unexpected and highly beneficial properties to acrylate/epoxy hybrid adhesive compositions. Most silanes participate exclusively in either the UV or thermal curing steps. The silanes may participate in both the UV and thermal curing steps if a combination of silanes are used, or if the particular silane happens to have functionalities that participate in both curing steps.

The silanes are used in amounts sufficient to affect the desired properties. The specific function of the silane is to alter the tape properties after UV cure or after the thermal curing step. One such property is the modulus or stiffness of the adhesive, which can be changed from a semi-structural adhesive to a structural adhesive simply by incorporation of a silane. The color shade of the tape after final curing can also be changed with the incorporation of organofunctional silanes. This is an unexpected discovery that enables one to easily determine the point at which final cure is achieved during the thermal curing process. It has been observed that at certain thermal curing temperatures, the shade change in the tape is a step change occurring over the course of seconds when the tape construction is held at a given thermal curing temperature. The use of silanes in epoxy/acrylate hybrid adhesive tape constructions also enables tape constructions to be optimized for a given color simply by adjusting the quantity of silane in a given formulation.

The manner in which the shade change occurs during thermal curing is not a gradual change over time at a given temperature. The change occurs very rapidly, presumably once the phase separation has occurred at the end of the epoxy curing process, which indicates the end of cure.

Organosilanes can also be used to crosslink the acrylate phase through various methods. One method involves allowing the individual vinyl or acrylate functional silane to condense with another identical silane molecule. Another method involves incorporation of an inorganic filler such as fumed silica, glass bubbles or other inorganic fillers that are capable of condensing with the silane functionality, which creates an inorganic crosslinking scaffold. Both of these approaches accomplish the desired function of gelling the acrylate phase of the hybrid adhesive tape construction.

In another preferred embodiment, the acrylate moiety is purposefully left uncrosslinked. The purpose of this is to impart thermally induced mass flow characteristics to the overall adhesive composition. In this specific case, both the acrylate species and epoxy species are mobile and capable of flowing when exposed to the thermal curing step. The advantage of this is to impart gap filling and sealing properties to the tape construction. In this specific case, the use of vinyl or acrylate functional silanes would be avoided because of their tendency to self condense and thereby crosslink the acrylate phase. The use of glycidyl functional silanes would be used in this case.

A preferred method for manufacturing the inventive tape constructions of the present invention involves four distinct steps. The first step involves the dissolving, blending, and dispersion of the epoxy resins and curatives in the acrylate monomers or syrup along with any fillers and silanes. The second step involves coating the compounded formulation on a single support liner, or between two liners to a given thickness and exposing the formulation to curing radiation. Enough radiation should be used to achieve an overall nonvolatile content that is>95%, as measured by thermogravimetric analysis. The third step involves converting the tape to rolls and assembly of the tape to the adherends. The final step involves exposing the bonded assembly to heat which initiates the epoxy curing mechanism and results in conversion and gellation of the epoxy portion of the composition. During this step phase separation of the epoxy occurs resulting in a two-phase morphology. The formation of two-phase morphology is what is believed to cause the shade change in the tape construction through a scattering mechanism. The function of the silanes is to specifically adjust and tailor this phase separation, and resulting domain size in such a fashion as to achieve specific target properties in the final tape construction. The discovery that silanes can radically alter the final tape appearance in pigmented systems is a simple and easy means of insuring that uniform performance in the tape product is achieved on a consistent basis.

Other additives that can be used include fibers, woven and nonwoven fabrics, glass or polymeric microspheres, and fillers such as silica.

The observation that organic dyes are capable of achieving a shade change during the thermal curing step, but do not demonstrate the ability to adjust the shade of the tape, is attributed to the solubility of the dye in the individual phases in the tape. In contrast, inorganic pigments, being particulate in nature are selectively excluded from the discontinuous phase during the phase separation process. The function of the silane is to control the resulting morphology (i.e., domain size and distribution) which enables one to alter the distribution of pigment particles in the tape leading to a change in the final shade of the tape. This is accomplished through a simple modification in the formulation.

The adhesives of the invention are useful for bonding a wide range of objects to various surfaces. Objects and surfaces can include glass, ceramics, metals, glass frit, plastics, and the like. In particular the adhesives are useful in bonding objects to glass plate, such as automobile windshields, or other optically transparent substrates so that the color change can be used as an indication of sufficient curing. The color of the adhesive can also be modified to provide an aesthetically pleasing surface when viewed through the window. The adhesives of the invention are also particularly useful in bonding non-transparent surfaces together when it is desirable to provide a particular color in the adhesive bond line. Objects that may be bonded to glass substrates include mirror bases for rear view mirrors, speakers, interior lights, and the like.

In a preferred method of practicing the invention, a pressure sensitive adhesive sheet material having a pigmented thermally curable adhesive is adhered to a mirror base which is then bonded to a glass plate. The composite is then heated to a temperature sufficient to cure the adhesive to a thermoset state, and to effect a visible color change. The color change is noted as a decrease in the intensity of the color or an increase in the 'L' value of the color as measured with a HunterLab calorimeter. For example, a black sheet material before final curing and having an 'L' value between 10 and 15 will turn to a gray color after thermally curing with an 'L' value between 20 and 40.

Test Procedures

90° Peel Adhesion

A 1.27 cm by 15.2 cm strip of the sheet material is laminated to a 0.13 mm thick strip of anodized aluminum. The aluminum strip is then laminated to a cold rolled stainless steel panel (304-BA) cleaned with 3 wipes of a 50/50 mixture of water and isopropanol and rolled down with 2 passes of a 6.8 kilogram roller. The panel is then attached a fixture in one jaw on an Instron Tester, so that the aluminum strip is pulled of at a 90° angle at a speed of 30.48 cm/minute. The peel adhesion is recorded in pounds per half inch, and converted to Newtons per decimeter (N/dm).

Shear Strength

The shear strength of the adhesive is determined by adhering a 1.27 cm by 2.54 cm strip of the sheet material between overlapping ends of ED-500 E-coated panels available from ACT (Advanced Coatings Technology, Hilsdale, Mich.), measuring 2.54 cm by 7.5 cm such that the free ends of the panels extend in opposite directions. The 2.54 dimension of the sheet material is placed across the width of the panels. The composite is rolled down with 2 passes of a 6.8 kg roller, then cured in an oven at 140 C. for 25 minutes. The sample is then cooled to room temperature and tested by extending the free ends of the panel in the jaws of an Instron Tensile Tester and separating the jaws at a speed of 5 cm/min. The results are recorded in pounds per inch and reported herein in MegaPascals (MPa).

Tensile Strength and Elongation After Final Cure

The sheet material is thermally cured for 25 minutes at 177 C. and cooled to room temperature. A dumbbell shaped test sample (prepared according to ASTM D-412) is clamped into the jaws of on Instron Tensile Tester and the jaws are separated at a speed of 50.8 cm per minute. The tensile force is required to break the test sample is shown in the tables in megaPascals MPa). The elongation at break is reported in percent of the original length (%).

Color 'L'

The color of a sample before and after curing is determined using a HunterLab colorimeter. The Color 'L' value is a HunterLab scale of lightness and darkness in color in which high numbers, i.e., closer to 100, are white, and low numbers, i.e., close to 0 are black. The test is performed according to manufacturer's instructions on a Color 'L' 100 Colorimeter and a D25A Optical Sensor, both available from HunterLab Associates, Reston, Va. The instrument is calibrated with a white tile having an 'L' value of 92, and a black tile having an 'L' value close to 0. A gray tile having an 'L' value of 30.9 is checked for comparison. The pressure sensitive adhesive sheet materials are measured for 'L' values before thermal curing by removing one of the polyester films from a 152.4 cm by 152.4 cm sample, and placing the exposed adhesive surface to the sensor. To cure the adhesive, one of the polyester films from a 152.4 cm by 152.4 cm sample is removed and the adhesive is placed in a flat bottomed aluminum pan with the other polyester film against the pan. The adhesive in the pan is then heated at 140° C. for 25 minutes, and then cooled to room temperature. The other film is removed from the adhesive, and the glossy side of the cured sheet material is measured for 'L' value. The adhesives of the invention consistently exhibit an increase in the 'L' value after thermal curing, which indicate that the cured adhesives have a lighter color than the uncured sheet material.

Cleavage Test

This test is a measure of how well a mirror base (also referred to as a mirror button) adheres to a glass plate. A U-shaped sintered stainless steel mirror button measuring 22 mm by 28 mm, obtained from SSI, Janesville, Wis.) is lightly sandblasted and cleaned by either wiping with acetone, or cleaning in an ultrasonic cleaner. A clear, tempered glass plate measuring 12.7 cm by 5.08 cm by 0.396 cm (available from Abrisa Industrial Glass, Ventura Calif.) is cleaned by wiping three times with a 50/50 mixture of distilled water and isopropanol. The plate is warmed in an oven at 82° C. for at least 10 minutes. A U-shaped piece of the pressure sensitive adhesive sheet material, cut slightly smaller than the mirror button, is applied to the mirror button. The mirror button is then adhered to the glass plate and laminated using a heated platen set at 177° C. and pressurized by an air cylinder with a line pressure of 550 kiloPascals line pressure for 6 seconds. The assembly is then heated in an oven at 140° C. for 25 minutes. The sample is then conditioned at room temperature and 40–60% relative humidity for at least 24 hours before testing.

The glass plate is then mounted vertically in a test fixture in one clamp of an Instron Tensile Tester A. A 70 mm long lever arm is attached to the mirror button so that it extends horizontally. The lever arm is then clamped into the Instron, and the lever arm is pulled upwardly at a rate of 2.5 millimeters per minute. The maximum value at break, i.e., when the mirror button breaks loose from the glass plate, is recorded in pounds and converted to Newtons.

Example 1

A composition was prepared by mixing 29 parts n-butyl acrylate with 29 parts N-vinyl caprolactam heated to about 50 C to form a solution. The following components were added to the solution: an additional 42 parts of n-butyl acrylate, 25 parts of diglycidyl ether oligomer of bisphenol A (Epon 1001F available from Shell Chemical Co.),and 45 parts diglycidyl ether of bisphenol A (Epon 828 available from Shell Chemical Co.). The mixture was mixed with a high shear mixer for about 2 hours as the temperature increased to about 52 C. The temperature was reduced to below about 38 C, and the following were added and mixed for about 30 minutes: 0.28 part benzil dimethyl ketal (Irgacure 651 available from Ciba Geigy), 0.1 part stabilizer (Irganox 1010 available from Ciba Geigy), 0.05 part hexanediol diacrylate, and 0.38 part black pigment (Pennco™9B117. The following were then added using a high shear mixer for about an hour: 7 parts micronized dicyandiamide (DYHARD available from SKW Chemical Co.), 2.7 parts 2,4-diamino-6-[2'-methylimidazolyl-(1')] ethyl-s-triazine (Curezol 2MZ-Azine from Air Products), and 8 parts of hydrophilic silica (Cab-O-Sil M-5 available from Cabot Corp.). An additional 0.1 part of the black pigment was added to the composition and mixed for about 45 minutes. The composition was then degassed under a vacuum, and coated to a thickness of about 0.51 millimeters between two polyester films that had been coated with a silicone release coating. The coated composite was then irradiated on both the top and bottom of the composite with ultraviolet lamps which have 90% of the emissions between 300 and 400 nanometers (nm), and a peak emission at 351 nm as measured with a UVIRAD radiometer (Model No. VR365CH3) available from E.I.T. (Electronic Instrumentation & Technology, Inc.). The intensity was about 2 milliwatts/square centimeter (mW/sq cm), and the energy above and below the coated composite was 350 milliJoules/square centimeter (mJ/sq cm), and the total energy was 700 mJ/sq cm. The coated sheet was tested according to the above described test methods, and test results are shown in Table 1.

The adhesive sheet material was cured at 177° C. for 25 minutes and the thermomechanical properties of the adhesive were determined using a Rheometrics Solids Analyzer II (RSA II), available from Rheometrics, Inc., at a frequency of 1 Hz. The samples were scanned from −40° C. to 120° C. at step increments of 2° C. and a soak time of 60 seconds. The adhesive had a storage modulus greater than about $2 \times 10^7$ dynes/square centimeter over a range of 40° C. to 100° C. The effective damping range, i.e., where tan delta is greater than 0.1, was from about −7° C. to about 160° C.

Examples 2–16

Sheet materials were prepared as in Example 1 except that varying amounts of two types of organofunctional silanes and a mixture of varying amounts of the silanes were added to the composition in the amounts per one hundred parts of acrylate and co-polymerizable monomers (pph) as shown in Table 1. Actual sheet thicknesses are also shown. The silanes used were methacryloxy propyl trimethoxy silane (M8550 available from Huls, America) and designated MPTS in the table, and glycidoxy propyl trimethoxy silane (Dynasylanglymo CG6720 available from Huls, America) and designated OPTS in the table, and a mixture of each of the silanes. For Examples 9–14, the diglycidyl ether oligomer of bisphenol A was mixed with butyl acrylate in a 2:1 ratio before adding to the composition. The additional amount of butyl acrylate was adjusted to 29.5 parts so that the composition, except for the silanes and pigment, was the same as in Example 1.

TABLE 1

| Ex | Silane | Silane amount pph | Sheet Thickness - mm | Shear Strength - MPa | Tensile Strength - MPa | Elong - % | 90° Peel Adhesion - N/dm | Color 'L' Before Curing | Color 'L' After Curing | Cleavage Test - Newtons |
|---|---|---|---|---|---|---|---|---|---|---|
| 1 | — | 0 | 0.47 | 22.1 | 7.6 | 52 | 104 | 14.4 | 30.6 | 455 |
| 2 | GPTS | 2 | 0.59 | 13.7 | 9.9 | 17.3 | 115 | 15.1 | 34 | 781 |
| 3 | GPTS | 4 | 0.54 | 14.9 | 10.4 | 1938 | 124 | 15.2 | 34.5 | 568 |
| 4 | GPTS | 6 | 0.64 | 13.3 | 9.3 | 27.6 | 112 | 15.3 | 34.9 | 253 |
| 5 | GPTS | 8 | 0.60 | 14.5 | 8.8 | 25.4 | 110 | 16 | 36.7 | 80 |
| 6 | GPTS | 10 | 0.67 | 13.9 | 7.9 | 31.2 | 107 | 16 | 38.4 | 85 |
| 7 | MPTS | 2 | 0.56 | 9.2 | 6.8 | 13.9 | 96 | 15.2 | 33.3 | 342 |
| 8 | MPTS | 10 | * | 3.5 | * | * | 91 | 15.7 | 20 | ** |
| 9 | GPTS | 0.5 | 0.71 | 10.4 | 8.5 | 19 | 168 | 14.1 | 36 | 667 |
| 10 | GPTS | 1 | 0.70 | 11.0 | 9.9 | 14.5 | 120 | 13.2 | 29.1 | 689 |
| 11 | MPTS GPTS | 0.05 0.5 | 0.70 | 14.7 | 10.3 | 15.5 | 113 | 12.7 | 34.3 | 565 |
| 12 | MPTS GPTS | 0.05 1 | 0.70 | 7.8 | 1.5 | — | 141 | 11.7 | — | 153 |
| 13 | MPTS GPTS | 0.5 0.5 | 0.69 | 8.4 | 4.3 | 18 | 139 | 13.3 | 35.2 | 591 |
| 14 | MPTS GPTS | 4 3 | * | 6.7 | * | * | 96 | 15.3 | 25.5 | ** |
| 15 | MPTS GPTS | 4 4 | 0.66 | 7.3 | 4.7 | * | 104 | 15.7 | 26 | ** |
| 16 | MPTS GPTS | 5 5 | 0.59 | 5.6 | * | | 87 | 16.8 | 23.3 | ** |

*Not tested — sample was too brittle
**Not tested — no tack to mirror base
—Data not available The data in Table 1 show that the physical properties of the adhesive sheet materials of the invention can be changed with the addition of silanes to make adhesives of different modulus. The color change after thermal curing consistently went from a black color to varying shades of gray (indicated by the Color 'L' values before and after curing), which shows that the final color of the adhesive can also be modified by selecting the type and amounts of silanes.

EXAMPLES 17–28

Sheet materials for Examples 17–19 were prepared as in Example 1 except that the amount of black pigment was varied as shown in TABLE 2.

Sheet materials for Examples 20–22 were prepared as in Example 1 except that a blue pigment, cupric potassium sulfate, was used in the amounts indicated in TABLE 2.

Sheet materials for Examples 23–27 were prepared as in Example 9 except that a red dye (para(1,2,2-cyanoethenyl)-N,N-diethyl aniline) was used. Organofunctional silanes were used in Examples 24–27 as follows: Example 24—0.5 pph GPTS; Example 25—0.05 pph MPTS; Example 26—0.05 pph MPTS and 1.0 pph GPTS; and Example 27—0.5 pph MPTS and 0.5 pph GPTS.

TABLE 2

| Ex | Colorant pph | Sheet Thickness mm | Shear Strength MPa | Tensile Strength MPa | Elong % | 90° Peel Adhesion N/dm | Color 'L' Before Curing | Color 'L' After Curing | Cleavage Test Newtons |
|---|---|---|---|---|---|---|---|---|---|
| 17 | 0.2 | .051 | 7.6 | 10.1 | 15.3 | 144 | 21.7 | 39.2 | 761 |
| 18 | 0.38 | 0.48 | 6.5 | 9.0 | 15.1 | 156 | 14.6 | 31.4 | 721 |
| 19 | 0.6 | 0.51 | 6.6 | 10.8 | 22.2 | 126 | 11 | 26.7 | 623 |
| 20 | 0.2 | 0.48 | 8.9 | 11.2 | 19.3 | 125 | 55.9 | 72.7 | 890 |
| 21 | 0.4 | 0.51 | 8.8 | 10.4 | 15.6 | 137 | 55.3 | 72.3 | 836 |
| 22 | 0.6 | 0.51 | 8.5 | 11.6 | 20.4 | 106 | 55.4 | 72.6 | 805 |
| 23 | 0.05 | 0.75 | | | | | 44.3 | 70.9 | |
| 24 | 0.05 | 0.75 | | | | | 43.8 | 71.3 | |
| 25 | 0.05 | 0.75 | | | | | 41.3 | 72.7 | |
| 26 | 0.05 | 0.75 | | | | | 41.6 | 72.5 | |
| 27 | 0.05 | 0.75 | | | | | 42.4 | 72.8 | |

The data in TABLE 2 show that the color changes can be effected by both pigments and dyes, and the amount of change can be controlled by the amount of pigment and the use of silanes.

What is claimed is:

1. A method of bonding a component to a surface comprising the steps of:
   (a) disposing a thermosettable pressure sensitive adhesive composition between said component and said surface, said pressure sensitive adhesive composition comprising
      (i) the polymerization product of a monomeric or partially polymerized composition comprising at least one polymerizable acrylic or methacrylic acid ester of a non-tertiary alcohol;
      (ii) a thermosettable epoxy resin; and
      (iii) a pigment,
         said polymerization product, said epoxy resin, said pigment, and the relative amounts thereof, being selected such that said pressure sensitive adhesive composition undergoes a detectable color change upon reaching a pre-determined level of cure; and (b) curing said pressure sensitive adhesive composition until said composition undergoes a detectable color change to form a thermoset adhesive bonding said component to said surface.

2. A method according to claim 1 comprising curing said pressure sensitive adhesive composition by exposing said composition to heat.

3. A method according to claim 1 comprising curing said pressure sensitive adhesive composition by exposing said composition to ultraviolet radiation.

4. A method according to claim 1 comprising disposing said pressure sensitive composition between said component and a glass surface.

5. A method according to claim 1 wherein said pigment comprises carbon black or graphite.

6. A method according to claim 1 wherein said pressure sensitive adhesive composition further comprises a organofunctional silane.

7. A method according to claim 1 wherein said pressure sensitive adhesive composition comprises the polymerization product of a monomeric or partially polymerized composition comprising (a) from about 50 to about 95 parts by weight of at least one acrylic or methacrylic acid ester selected from the group consisting of isooctyl (meth) acrylate, isononyl (meth)acrylate, decyl (meth)acrylate, dodecyl (meth)acrylate, butyl (meth)acrylate, ethyl hexyl (meth)acrylate, and hexyl (meth)acrylate; and (b) from about 50 to about 5 parts by weight of at least one copolymerizable monomer selected from the group consisting of isobornyl acrylate, N-vinyl caprolactam, N-vinyl pyrrolidone, N-vinyl piperidine, N,N-dimethylacrylamide, and acrylonitrile.

8. A method according to claim 1 comprising providing said pressure sensitive adhesive composition in the form of a sheet, and disposing said sheet between said component and said surface.

9. A method according to claim 1 comprising curing said pressure sensitive adhesive composition to form a thermoset adhesive having a tan delta value of greater than about 0.1 between a temperature range of about 0° C. and 170° C.

10. A method according to claim 1 comprising curing said pressure sensitive adhesive composition to form a thermoset adhesive having a storage modulus greater than about $2 \times 10^7$ between a temperature range of about $-40°$ C. to 100° C.

11. A method according to claim 1 wherein said thermosettable pressure sensitive adhesive composition flows during the curing step.

12. A method according to claim 1 comprising bonding a metal component to a glass surface.

13. A method according to claim 1 comprising bonding a mirror button to a glass surface.

14. A method according to claim 1 comprising curing said pressure sensitive adhesive composition until said composition undergoes a detectable color change to form a thermoset adhesive characterized by a color that is lighter than the color of said pressure sensitive adhesive composition.

15. A thermosettable pressure sensitive adhesive composition comprising:

(i) the polymerization product of a monomeric or partially polymerized composition comprising at least one polymerizable acrylic or methacrylic acid ester of a non-tertiary alcohol;

(ii) a thermosettable epoxy resin; and (iii) a pigment, said polymerization product, said epoxy resin, and said pigment, and the relative amounts thereof, being selected such that said pressure sensitive adhesive composition is capable of undergoing a detectable color change upon reaching a pre-determined level of cure.

* * * * *

UNITED STATES PATENT AND TRADEMARK OFFICE
CERTIFICATE OF CORRECTION

PATENT NO.    : 6,348,118 B1
DATED         : February 19, 2002
INVENTOR(S)   : Michael A. Johnson and Jon M. Pennycook It is certified that error appears in the above-identified patent and that said Letters Patent is hereby corrected as shown below:

<u>Column 3,</u>
Line 7, delete "ketall" and insert in place thereof -- ketal --.
Line 35, delete "thereof" and insert in place thereof -- thereof. --.
Lines 57-58, delete "2,4-diamino-6-(2-methyl-imidazoyl)-ethyl-s-triazine isocyanurate" and insert in place thereof -- 2,4-diamino-6-(2'-methyl-imidazoyl)-ethyl-s-triazine isocyanurate --.

<u>Column 4,</u>
Line 49, delete "etboxy" and insert in place thereof -- ethoxy --.

<u>Column 6,</u>
Line 39, delete "calorimeter." and insert in place thereof -- colorimeter --.

<u>Column 8,</u>
Line 45, delete "2x107" and insert in place thereof -- $2x10^7$ --.
Line 61, delete "OPTS" and insert in place thereof -- GPTS --.

Signed and Sealed this

Sixteenth Day of September, 2003

JAMES E. ROGAN
*Director of the United States Patent and Trademark Office*